(12) United States Patent
Kang et al.

(10) Patent No.: US 8,128,878 B2
(45) Date of Patent: Mar. 6, 2012

(54) GAS-PHASE POLYMERIZATION OF ALPHA-OLEFIN

(75) Inventors: Sung Woo Kang, Daejeon (KR); Nam Kyu Kim, Daejeon (KR); Young Jae Jun, Daejeon (KR); Man Jung Kim, Yeosu-si (KR); Kil Su Kim, Yeosu-si (KR)

(73) Assignee: Daelim Industrial Co., Ltd.

( * ) Notice: Subject to any disclaimer, the term of this patent is extended or adjusted under 35 U.S.C. 154(b) by 0 days.

(21) Appl. No.: 13/186,759

(22) Filed: Jul. 20, 2011

(65) Prior Publication Data

US 2011/0274589 A1 Nov. 10, 2011

Related U.S. Application Data

(62) Division of application No. 13/090,973, filed on Apr. 20, 2011, now Pat. No. 8,058,368.

(30) Foreign Application Priority Data

| Apr. 30, 2010 | (KR) | 10-2010-0040847 |
| Jun. 30, 2010 | (KR) | 10-2010-0062515 |
| Jun. 30, 2010 | (KR) | 10-2010-0063073 |

(51) Int. Cl.
- *B01J 8/18* (2006.01)
- *C08F 2/00* (2006.01)
- *C08F 210/00* (2006.01)
- *C08G 85/00* (2006.01)

(52) U.S. Cl. .............. 422/139; 526/68; 526/69; 526/70; 526/348

(58) Field of Classification Search .................. 422/139; 526/68, 69, 70, 348
See application file for complete search history.

(56) References Cited

U.S. PATENT DOCUMENTS
2006/0251807 A1 * 11/2006 Hong et al. .................. 427/212

FOREIGN PATENT DOCUMENTS

| JP | 2004-130194 | * | 4/2004 |
| KR | 10-1998-0043364 A | | 9/1998 |
| KR | 10-2001-0057929 | | 7/2001 |
| KR | 10-0951896 B1 | | 4/2010 |

* cited by examiner

*Primary Examiner* — William Cheung
(74) *Attorney, Agent, or Firm* — Park & Associates IP Law, P.C.

(57) ABSTRACT

A method for preparing polyolefin from alpha-olefin with high productivity using an internal circulating fluidized bed polymerization reactor is disclosed. The method for gas-phase polymerization of alpha-olefin comprising the steps of: supplying circulation gas including one or more alpha-olefins and inert gas into a polymerization reactor; polymerizing the alpha-olefin to polyolefin in two separated polymerization areas in the polymerization reactor; and discharging produced polyolefin from the polymerization reactor. The polymerization reactor is divided into the two polymerization areas by a draft tube, and an inside of the draft tube forms a riser where growing polyolefin polymers move up in fast fluidization, and an outside of the draft tube forms an annulus where the polyolefin polymers passing the riser move down by gravity, and the polyolefin polymers passing the annulus are introduced to a lower part of the riser again, so that the polyolefin polymers are polymerized during circulating between the riser and the annulus.

2 Claims, 5 Drawing Sheets

GAS-PHASE POLYMERIZATION OF ALPHA-OLEFIN

REFERENCE TO RELATED APPLICATIONS

This is a divisional application of U.S. patent application Ser. No. 13/090,973 filed on Apr. 20, 2011, now U.S. Pat. No. 8,058,368, which claims the priority benefits of Korean Patent Application No. 10-2010-0040847 filed on Apr. 30, 2010, and Korean Patent Application Nos. 10-2010-0062515 and 10-2010-0063073 both filed on Jun. 30, 2010.

FIELD OF THE INVENTION

This invention relates to a gas-phase polymerization of alpha-olefin, and more particularly, to a method for preparing polyolefin from alpha-olefin with high productivity using an internal circulating fluidized bed polymerization reactor to induce internal circulation of polyolefin particles and increase the contact time of circulation gas with polyolefin particles.

BACKGROUND OF THE INVENTION

Industrial methods for preparing polyolefin from olefin include a solution polymerization process, a slurry polymerization process and a gas-phase polymerization process. In the solution polymerization process, polymers are produced in a dissolved state in a solvent. In the slurry polymerization process, polymers of solid state are produced and dispersed in a liquid medium. In the gas-phase polymerization process, produced polymers are dispersed in a fluidized state in a gas medium. Generally, in the gas-phase polymerization process, polymerization is carried out by using a bubbling fluidized bed polymerization reactor.

Due to the development of metallocene catalysts having superior catalytic activity and selectivity, industrial-scale processes for preparing polyolefin from alpha ($\alpha$)-olefin under the solid catalyst in a gas phase medium are widely used. In the gas-phase polymerization method, in order to maintain a polymer bed through which reaction gas flows, the reaction bed is mechanically stirred (stirred bed reactor) or a reaction gas is continuously circulated to fluidize the reaction bed in a suspension state (fluidized bed reactor). In the stirred bed reactor and the fluidized bed reactor, the composition of monomers around produced polymer particles remains constant by an induced stirring and is maintained like an ideal state of a Continuous Stirred Tank Reactor (CSTR). Thus, the reaction condition can be easily controlled, and products of uniform quality can be obtained under a steady-state condition.

Nowadays, the most common industrial gas-phase polymerization method utilizes a fluidized bed reactor operated under a "bubbling" condition. FIG. 1 shows an internal circulating (circulation type) fluidized bed polymerization reactor (bubbling fluidized bed reactor 10) where the conventional polymerization method is carried out. As shown in FIG. 1, in the conventional bubbling fluidized bed reactor 10, circulation gas flows into the reactor through circulation gas inlet 11 and a gas distributor (distribution plate) 12, and polymerized by contacting with polyolefin particles in the reactor 10, and the unreacted circulation gas is discharged through an outlet 13. Catalysts and/or pre-polymers can be introduced into the reactor 10 through a catalyst or pre-polymer inlet 14. The bubbling fluidized bed polymerization reactor has superior heat removability and homogeneous temperature distribution compared with other polymerization reactors. Thus, the composition in the reactor remains constant, and reactants of solid state (i.e., polymer) can be stayed in the reactor for a relatively long time, and the reactants of solid state flows like fluid in the reactor, which allows easy handling of the polymer. Beside these various advantages, there is another advantage in that operation and design of the reactor are easy because of its simple structure.

However, it is difficult to increase the contact frequency and the contact time between the catalysts and the reactants in the bubbling fluidized bed. This limits the productivity per unit volume of the reactor. To solve these problems, U.S. Pat. No. 5,834,571 and U.S. Pat. No. 5,436,304 disclose methods for increasing productivity by injecting condensation-inducing materials into the circulation gas, and by directly injecting liquid into the bubbling fluidized bed. However, the method of changing the composition of the circulation gas causes a drastic change of the reaction condition, and additional costs are necessary for mounting a pump to inject the condensation-inducing materials and a reservoir for condensate.

As shown in FIG. 1, in the conventional method, polymers exist within a vertical cylindrical area of reactor 10, and reaction gas discharged through the outlet 13 of reactor 10 is compressed and cooled by a compressor, and recycled to a lower part of the polymer bed through the inlet 11 of the reactor 10, preferably, with makeup monomers and a suitable amount of hydrogen gas. In the gas medium, entrainment of the solid polymer is prevented by suitably designing the upper part of the reactor 10 to provide a freeboard, namely, a space between the surface of the polymer bed and the gas outlet. That is, the entrainment of the solid polymer is controlled as the velocity of the gas in upper part of the reactor 10 is reduced. In some methods, the velocity of the gas is reduced by installing a cyclone in the gas outlet line. The flow velocity of the circulation gas is controlled within the range between "a minimum fluidizing velocity" and "a transport velocity". The heat of reaction is removed by cooling the circulation gas, or can be controlled by adding inert gas. Reactor is usually controlled at constant pressure of 1 to 3 MPa, and catalysts are continuously supplied, and composition of polymer is controlled according to the composition of the gas phase. Hereinafter, the fluidized bed for the gas-phase polymerization is explained in more detail.

(A) Removal of Heat of Reaction

In the gas-phase polymerization reaction, the maximum fluidizing velocity of the circulation gas is limited very narrowly, and the freeboard volume larger than the volume of the fluidized bed is necessary, and the temperature of the gas inlet is maintained preferably higher than the dew point of the gas mixture. The productivity of the reactor (production amount per hour for a unit cross section of the reactor) is limited according to a heat of reaction, polymer dimension, and a gas density. Especially, in case of preparing a copolymer of ethylene and higher $\alpha$-olefin (for example, hexene, octene) by using a conventional Ziegler-Natta catalyst, productivity may be decreased. Methods to control the inner temperature of the reactor and remove the heat of reaction by using a partial condensation of the circulation gas and latent heat of evaporation of condensate were provided (European patent No. 89691, U.S. Pat. No. 5,352,749, and international patent publication No. WO 94/28032), but the operation of the fluidized reactor is very important in these methods. In European patent No. 89691 and U.S. Pat. No. 5,352,749, a turbulence, which is produced by a grid which distributes liquid onto polymers, is used. However, if polymers are sticky, uncontrollable phenomena may occur such as a formation of agglomerates or an inequality of liquid distribution because of a cohesion in plenum. Moreover, in the methods, problems relates to a distribution of wettable solids may arise in the plenum. And, the identification standard mentioned in U.S. Pat. No. 5,352,749 is appropriate in a steady state, but cannot offer desirable solutions to temporary "abnormal reaction" situation which can cause irreversible loss of fluidization bed and the accompanying shutdown of a reactor. In the mentioned method of international patent publication No. WO 94/28032, the heat of reaction is controlled by separating agglomerates and by using dimension of a nozzle and a grid. Actually, in reaction condition, agglomerates contain solids so that the less agglomerates, the higher concentration of the solid, and efficiency depend on violent circulation of solids in the reactor. However, it is difficult to disperse a suspension uniformly into a number of nozzles, and if one of the nozzles is clogged, liquid evaporated from the relevant part is unevenly distributed and an imbalance in gas flow velocity occurs by plenty of agglomerates so that efficiency may be deteriorated. Moreover, the reactor must be completely stopped when the nozzles are repaired.

(B) Discharge of Products

The most simple method to discharge polymers from a reactor is to directly discharge polymers from the fluidized bed by a control valve. This method has advantages of no generation of stagnant zone and simplicity. If the pressure at the lower stream of the discharging valve is maintained low (0.5 to 3 bar gage), monomers dissolved in polymers are evaporated, or partial pressures of the monomers in gas become low, and the temperature falls, and thus the reaction is stopped actually. However, the amount of gas discharged with polymers through an orifice from the fluidized bed depends on the pressure of reactor, a fluidizing velocity, a density of solid in the bed, and so on, and is generally large. Thus, it is necessary for the gas to be recompressed and returned to the reactor from the collector because the large amount of gas discharged with polymers increases the production costs and operation costs. Therefore, discontinuous discharging systems with two or more hoppers operated alternately are used in many industrial reactors. For example, U.S. Pat. No. 4,621,952 discloses a discharging system in which polymers are intermittently transferred from a reactor to a temporary (stationary) tank by high differential pressure. In the filling stage, momentum of polymers effects on the wall of a temporary tank and then on the polymer bed, and densifies polymer particles and takes fluidity from the polymers. In filling stage, inner pressure of the temporary tank quickly increases to the pressure of the reactor, and temperature is maintained. However, polymerization reaction is adiabatically progressed at high speed so that soft and adhesive products become agglomerates which cannot be granulated, and it becomes difficult to discharge them to a collecting tank. Similar problems may happen in the method of U.S. Pat. No. 4,703,094. Complex continuous systems are being developed because of the shortcomings of the intermittent systems. For example, a screw is installed inside a reactor to densify and discharge polymers in Japanese patent Laid-open No. 58-032634, and an extruder is installed inside a fluidized bed reactor in U.S. Pat. No. 4,958,006. However, these methods are complex and not suitable for an industrial application, and it is difficult to supply polymers to a next reaction stage.

SUMMARY OF THE INVENTION

Therefore, it is an object of the present invention to provide a method for gas-phase polymerization of alpha-olefin which can obviate the disadvantages of the conventional fluidized bed processes and has superior productivity.

It is other object of the present invention to provide a method for gas-phase polymerization of alpha-olefin which can effectively remove heat of reaction by increasing the contact time of a gas phase and a solid phase by an internal circulation of polymers and can increase catalytic activity and the productivity of polymers.

It is another object of the present invention to provide an internal circulating fluidized bed polymerization reactor which maximizes the contact time of polyolefin particles and a reaction (circulation) gas by inducing an internal circulation of polyolefin particles and thereby increasing the productivity of polymers.

In order to achieve these and other objects, the present invention provides a method for gas-phase polymerization of alpha-olefin comprising the steps of: supplying circulation gas including one or more alpha-olefins and inert gas into a polymerization reactor; polymerizing the alpha-olefins to polyolefin in two separated polymerization areas in the polymerization reactor; and discharging produced polyolefin from the polymerization reactor, wherein the polymerization reactor is divided into the two polymerization areas by a draft (draught) tube, and the inside of the draft tube forms a riser where growing polyolefin polymers move up in fast fluidization (condition), and the outside of the draft tube forms an annulus where the polyolefin polymers passing the riser move down by gravity, and the polyolefin polymers passing the annulus are introduced to the lower part of the riser again, so that the polyolefin polymers are polymerized during circulating between the riser and the annulus.

The present invention also provides a method for gas-phase polymerization of alpha-olefin comprising the steps of: producing polyolefin pre-polymers by pre-polymerizing catalyst, liquid isobutane, and one or more alpha-olefins in a pre-polymerization reactor; supplying the mixture of the catalyst and the pre-polymers, and circulation gas including one or more alpha-olefins and inert gas to a polymerization reactor; polymerizing the pre-polymers and the alpha-olefin to polyolefin in a polymerization area of the polymerization reactor; and discharging produced polyolefin polymers from the reactor.

The present invention also provides an internal circulating fluidized bed polymerization reactor, comprising: a draft tube installed in the reactor, in which at least one penetration hole penetrating an inside and an outside of the draft tube is formed; and a gas distribution plate which is formed with an inclination from an outside of the draft tube to a side wall of the polymerization reactor. The present invention further also provides an internal circulating fluidized bed polymerization reactor, comprising: a draft tube installed in the polymerization reactor, in which at least one penetration hole penetrating an inside and an outside of the draft tube is formed; a partition tube which is located between the draft tube and a side wall of the polymerization reactor and divides an inside area of the reactor into an annulus and an outside area; a gas distribution plate which is formed with an inclination from an outside of the partition tube to the side wall of the polymerization reactor; and an annulus distribution plate which is formed with an inclination from an outside of the draft tube to the partition tube.

In the method for polymerization of alpha-olefin according to the present invention, produced pre-polymers, catalyst, and reactants can easily form a slurry (that is, solubility of pre-polymers decreases) by using liquid isobutane at the pre-polymerization stage, and high concentration of alpha-olefin can be maintained by increasing its partial pressure. Thus, the productivity (polymerization yield: grams of pre-polymers per a gram of catalyst) of pre-polymers increases. Moreover, there are advantages in that heat of polymerization reaction can be removed effectively by using the circulation gas comprising inert gas in the gas-phase polymerization stage, and catalytic activity and polymer productivity increases. In the present invention, the contact time and the contact frequency of polyolefin particles and a reaction (circulation) gas increase and thereby the productivity of polymers increases. The polymerization reactor of the present invention has a relatively simple structure and the operation and design of the reactor is easy.

DETAILED DESCRIPTION OF THE INVENTION

A more complete appreciation of the invention, and many of the attendant advantages thereof, will be better appreciated by reference to the following detailed description.

Figure 2:
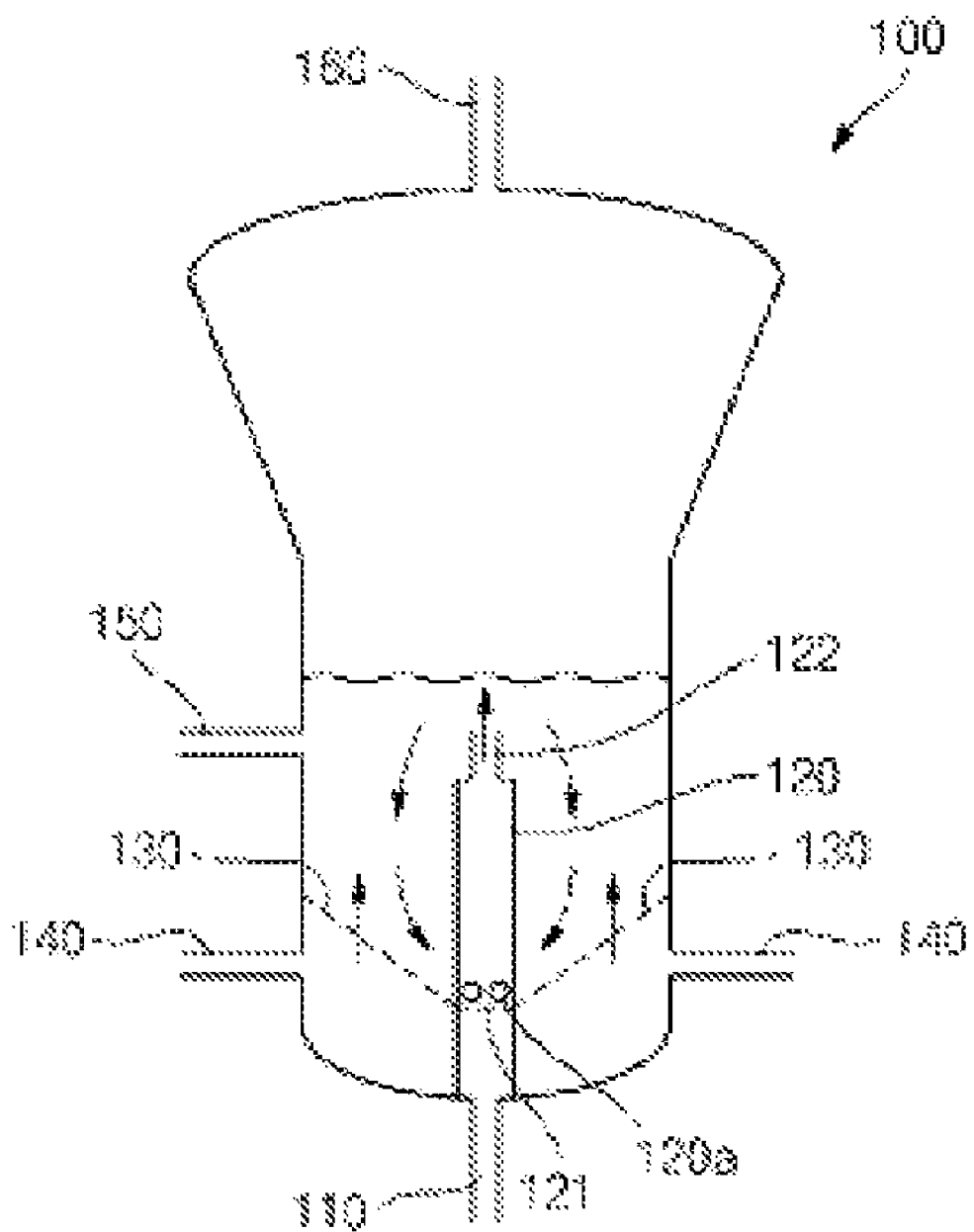
FIGS. 2 and 3 respectively show an internal circulating fluidized bed polymerization reactor where the polymerization method of alpha-olefin according to the first and second embodiment of the present invention can be carried out.

The method for gas-phase polymerization of alpha-olefin according to the first embodiment of the present invention comprises the steps of: supplying circulation gas including one or more alpha-olefins and inert gas into a polymerization reactor, specifically, an internal circulating (circulation type) fluidized bed polymerization reactor; polymerizing the alpha-olefins to polyolefin in two separated polymerization area in the polymerization reactor; and discharging produced polyolefin from the polymerization reactor. FIG. 2 shows the internal circulating fluidized bed polymerization reactor where the polymerization method according to the first embodiment of the present invention can be carried out. As shown in FIG. 2, the internal circulating fluidized bed polymerization reactor 100 may comprise a draft tube 120, a gas distribution plate 130, the first circulation gas inlet 110, the second circulation gas inlet 110, a catalyst and pre-polymers inlet 150, a gas outlet 160, polyolefin outlet (not shown), and so on. The polymerization reactor 100 can increase the productivity of polyolefin by increasing the contact time and the contact frequency of polyolefin particles and the circulation gas by inducing internal circulation of the produced polyolefin particles.

The draft tube 120 is installed inside, preferably in the central part of the polymerization reactor 100 and divides the fluidized bed (the area under the broken line in FIG. 2) where polyolefin is polymerized into two areas. The lower part of the draft tube 120 is connected to first circulation gas inlet 110 to supply circulation gas into the fluidized bed, the area for polymerization reaction. At least one penetration hole 120a which penetrates the inside and outside of the draft tube 120 to enable polyolefin particles of the lower part of the fluidized bed to flow into the draft tube 120 can be formed. Namely, the penetration hole 120a penetrates the draft tube 120. And in the upper part of the draft tube 120, an internal outlet 122 where circulation gas and polyolefin particles are discharged to the upper part of the fluidized bed may be formed. Therefore, as shown by arrows in FIG. 2, the circulation gas injected from the first circulation gas inlet 110 and polyolefin particles (polymers) flowing from the penetration hole 120a move up to the upper part in the draft tube 120 and are discharged from the internal outlet 122 on the upper part of the draft tube 120, and move down to the lower part outside of the draft tube 120 to be internally circulated in the fluidized bed. Thus, the polymerization reactor 100 is divided into two polymerization areas by the draft tube 120, and the inside of the draft tube 120 forms a riser (area) where growing polyolefin polymers move up in fast fluidization, and the outside of the draft tube 120 forms an annulus (area) where the polyolefin polymers from the riser move down by gravity. And then, the polyolefin polymers passing the annulus are introduced to the riser again, so that the polyolefin polymers are polymerized by circulating between the riser and the annulus.

The draft tube 120 may have various shapes such as cylinder, square pillar, and so on, and preferably may have a cylindrical shape. And the shape of the internal outlet 122 is not limited to a tube shape, and may have various shapes, which enable the circulation gas and polyolefin particles to be discharged, such as perforated plates, bubble caps or nozzles, spargers, conical grids, pierced sheet grids, and so on. The penetration hole 120a may also have various shapes such as circles, ovals, squares, and so on, and preferably may be a square. The penetration hole 120a can be formed to have the area of 15 to 150% of the horizontal cross-sectional area of the draft tube 120. If the area of the penetration hole 120a is within the range, inflow of polyolefin particles is easily achieved. While, if the penetration hole 120a is too large, polyolefin particles in the draft tube 120 rather may be spilled. There may be several, preferably 2 to 8 penetration holes 120a at the vertically same or different heights of the polymerization reactor 100.

The first circulation gas inlet 110 supplies the circulation gas to the lower part (riser) of the draft tube 120 for the circulation gas to move at fast fluidization. That is, the circulation gas is supplied to the lower part of the draft tube 120 and moves up with a flow velocity of 20 to 200 times, preferably 20 to 150 times, more preferably 25 to 100 times and most preferably 40 to 80 times of the minimum fluidization velocity in the draft tube 120. The minimum fluidization velocity is a gas velocity when the drag force of solid particles produced by the gas upwardly flowing in the solid particles and the weight of solid particles are same. If necessary, an inner distribution plate 121 to disperse and supply the circulation gas in bubble form can be installed between the first circulation gas inlet 110 and the penetration hole 120a in the draft tube 120. The circulation gas supplied through the inner distribution plate 121 can be operated with the flow velocity of 2 to 30 times, preferably 2 to 15 times of the minimum fluidization velocity. The inner distribution plate 121 may have various forms such as perforated plates, bubble caps or nozzles, spargers, conical grids, pierced sheet grids for uniform dispersion of inlet gas.

Meanwhile, in the method of gas-phase polymerization of the present invention, the material forming the fluidized bed is solid particles, and diffusion rate of reactants of gas phase to the solid particles should be increased, and the contact area between the solid particles and gas phase reactants should be maximized to increase the polymerization reaction rate. Therefore, the efficiency of the reactor depends on the dispersion efficiency of the circulation gas (that is, reactants of gas phase) to the solid particles. In the reactor for the present invention, the pressure loss and the energy consumption of the circulation gas increases because the total sectional area of the holes of the inner distribution plate 121 is smaller than the sectional area of the circulation gas pipe. Moreover, the inner distribution plate 121 is not easy to install in the riser of the internal circulating fluidized bed reactor, and is expensive because it must be designed with overall consideration of dispersion of gas, entrainment of solid particles, energy consumption, and so on. For the circulation of solid particles in the riser, gas (flow) velocity must remain fast, but solid particles may be stagnant between holes of the inner distribution plate 121. Therefore, it is preferable not to install the inner distribution plate 121 if the circulation gas is dispersed properly.

The second circulation gas inlet 140 is built on the side wall of the polymerization reactor 100 and performs a role to inject the second circulation gas to the annulus in the polymerization reactor 100, preferably to the lower part of the annulus. Moreover, in the upper part of the second circulation gas inlet 140, gas distribution plate 130 to disperse the circulation gas supplied into the polymerization reactor 100 through the second circulation gas inlet 140 in bubble form can be installed between the outside wall of the draft tube 120 and inside wall of the polymerization reactor 100. The gas distribution plate 130 is formed with a inclination to the bottom of the polymerization reactor 100, preferably has a structure rising to the side wall (inside wall) of the polymerization reactor 100 at the inclination of 15 to 70° to the bottom of the polymerization reactor 100. The second circulation gas passing the annulus, that is moving up, can be operated with a flow velocity of 0.5 to 30 times, preferably 2 to 30 times, more preferably 5 to 25 times, most preferably 10 to 20 times of the minimum fluidization velocity. It is preferable that the penetration hole 120a is formed at a higher position than the contact position of the gas distribution plate 130 and the draft tube 120 for easy inflow of polyolefin particles to the penetration hole 120a. Thus, if the gas distribution plate 130 inclines, densified polyolefin particles easily gather round the penetration hole 120a of the draft tube 120 and easily flow into the penetration hole 120a. Chunks may be formed due to insufficient removal of heat of polymerization because stagnant sections increases if the inclination of the gas distribution plate 130 is less than 15°, or chunks may be formed by congestion at the annulus because inflow of polymers to the draft tube 120 is small if the inclination of the gas distribution plate 130 is more than 70°. The gas distribution plate 130 may have various forms such as perforated plates, bubble caps or nozzles, spargers, conical grids, pierced sheet grids to enable circulation gas to be dispersed to uniform and sufficiently small bubbles.

The catalyst and pre-polymers inlet 150 is to optionally supply catalyst and polyolefin pre-polymers for polymerization reaction into the reactor 100. It is preferable that the catalyst and pre-polymers inlet 150 is located at the side wall (between bottom of the reactor and fluidized bed of polyolefin particles) of the polymerization reactor 100 in which fluidized bed is formed so that the mixture of catalyst and pre-polymers can be dispersed and supplied smoothly through the fluidized bed of polyolefin particles. The gas outlet 160 is located at the top of the polymerization reactor 100 and discharges the unreacted circulation gas out of the polymerization reactor 100. The circulation gas which flows into the polymerization reactor 100 through the first and/or second circulation gas inlet 110, 140 carries out the polymerization reaction while circulating inside the reactor 100, and gas generated as byproduct of polymerization reaction or surplus gas is discharged from the polymerization reactor 100 through the gas outlet 160. Size and others of the gas outlet 160 have to be properly adjusted to discharge the circulation gas and not to discharge polyolefin particles. The polymerization reactor 100 comprises a polyolefin outlet (not shown) to discharge polyolefin particles produced by polymerization reaction, and location, size and others of the outlet can be adjusted as necessary, for example, the location of the outlet may be the lower part of the reactor 100.

In the present invention, polyolefin particles (polymer) growing by the polymerization of alpha-olefin move (flow) up through the riser inside the draft tube 120 under fast fluidization, and leave the riser and enter the annulus (ring type) which is a descent area outside of the draft tube 120, and move (flow) down in a densified form by the effect of gravity, and then are reintroduced to the annulus polymerization area again through the riser so that polymers are circulated between the two polymerization areas. In the annulus where polymers flow in a densified form by gravity, solid density increases (solid density=weight (kg) of polymers/volume ($m^3$) occupied by polymers) to a bulk density of polymers, and plus (+) gain of pressure is generated along the flow direction so that polymers can be resupplied to the riser without specific aid of a mechanical contrivance. In this way, the circulation of polymers is carried out and limited by pressure valance of the two polymerization areas and head loss introduced in the system. Therefore, the method for polymerization of the present invention induces internal circulation of polyolefin particles to increase contact time and contact frequency between the polyolefin particles and the circulation gas, so that productivity of polyolefin (polymer) increases.

As commonly known, the fast fluidization state is formed when the velocity of fluidized gas (specifically, circulation gas) is higher than the velocity of solid particles (specifically, polyolefin particles), and is characterized in that pressure gradient of the fluidized gas in its moving direction is a monotone function of the amount of supplied gas to maintain the flow velocity and density of fluidized gas. Therefore, in the conventional method for fluidized bed, the velocity of fluidized gas is maintained much smaller than the transport velocity of solid particles to suppress entrainment of solid particles and discharge of particles with gas. In this specification, the terms "transport velocity", "fast fluidization", "minimum fluidization velocity" and so on are used as their general meanings, and, for example, defined in "D.Geldart, Gas Fluidization Technology, p. 155 et seqq., J. Wiley & Sons Ltd., 1986". Therefore, the polymerization method of the present invention uses different method from the conventional knowledge.

The circulation gas flowing into the draft tube 120 or the reactor 100 is the reaction gas used for polymerization of polyolefin and comprises alpha-olefin(s) and one or more inert gas (dispersion medium), and induces inner circulation of polymerized polyolefin particles by flowing into the draft tube 120 and the reactor 100 with a flow velocity to form sufficiently small bubble bed or slugging bed. The alpha-olefin is a compound represented by $CH_2=CHR$ (wherein, R is a hydrogen atom or a hydrocarbon radical of 1 to 12 carbon atoms), for example, ethylene, 1-hexene, and so on. And, the inert gas is selected from the group consisting of nitrogen and aliphatic hydrocarbon compounds of 2 to 6 carbon atoms, and the total partial pressure of the inert gas is 5% to 90%, preferably 30% to 90% with respect to the total pressure of the circulation gas. The inert gas may be single gas or mixture of two or more gases, preferably alkyl compounds such as ethane, isobutane or nitrogen. The inert gas maintains total reaction pressure enough to maintain the head pressure of a circulating compressor to be low, and at the same time, controls reaction dynamics and induces heat exchange of particles in the bed, and guarantees mass flow velocity proper to remove the heat of reaction unremoved by the a cooler of the circulation gas. If necessary, as a catalyst used in the polymerization method of the present invention, conventional olefin polymerization catalyst such as metallocene catalyst supported on silica (for example, ((n-BuCp)$_2$ZrCl$_2$) and so on can be used without limitation.

The method of the present invention can be applied for polymerization of various polyolefins which include (1) ethylene homopolymers or high density polyethylene (HDPE having relative density of more than 0.940) which is copolymers of alpha-olefin of 3 to 14 carbon atoms and ethylene, (2) linear low density polyethylene (LLDPE having relative density of less than 0.940), very low density polyethylene and ultra low density polyethylene (VLDPE and ULDPE having relative density of 0.920 to 0.880) which is copolymers of one or more alpha-olefins of 3 to 14 carbon atoms and ethylene, (3) elastic copolymers of ethylene and propylene having ethylene-induced unit of 30 to 70 weight %, or elastic terpolymers of diene, propylene and ethylene, (4) crystalline copolymers of propylene, ethylene and/or alpha-olefin having propylene-induced unit of more than 85 weight %, and isotactic polypropylene, (5) propylene heteropolymers produced by sequential polymerization of ethylene and/or a mixture of other alpha-olefin and propylene, (6) amorphous copolymers of propylene, ethylene and/or other alpha-olefin having propylene-induced unit of more than 70 weight %, and atactic polypropylene, (7) poly-alpha-olefin, for example, poly-1-butene, poly-4-methyl-1-pentene, (8) polybutadiene and other polydiene rubber.

Figure 3:
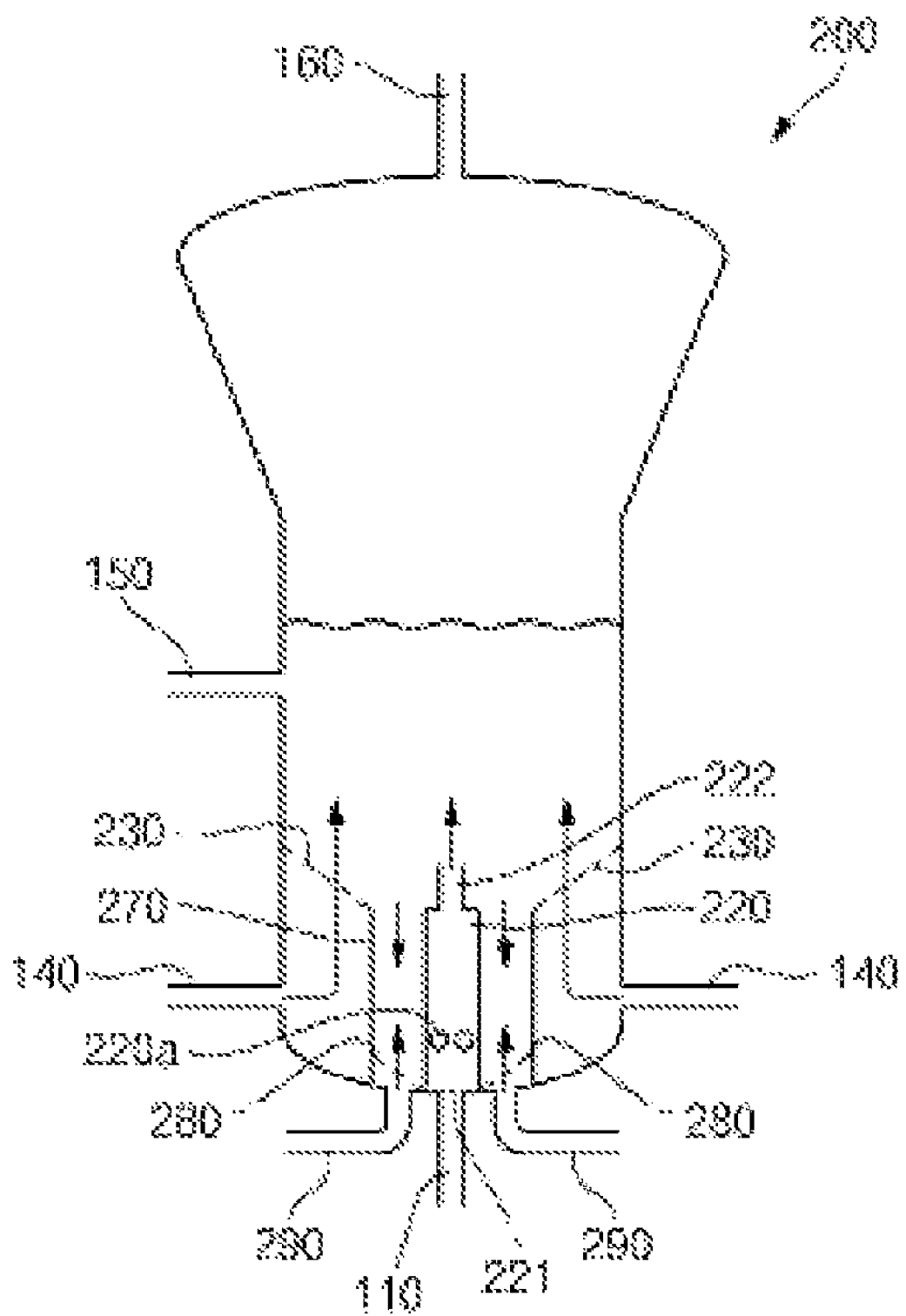
Figure 5:
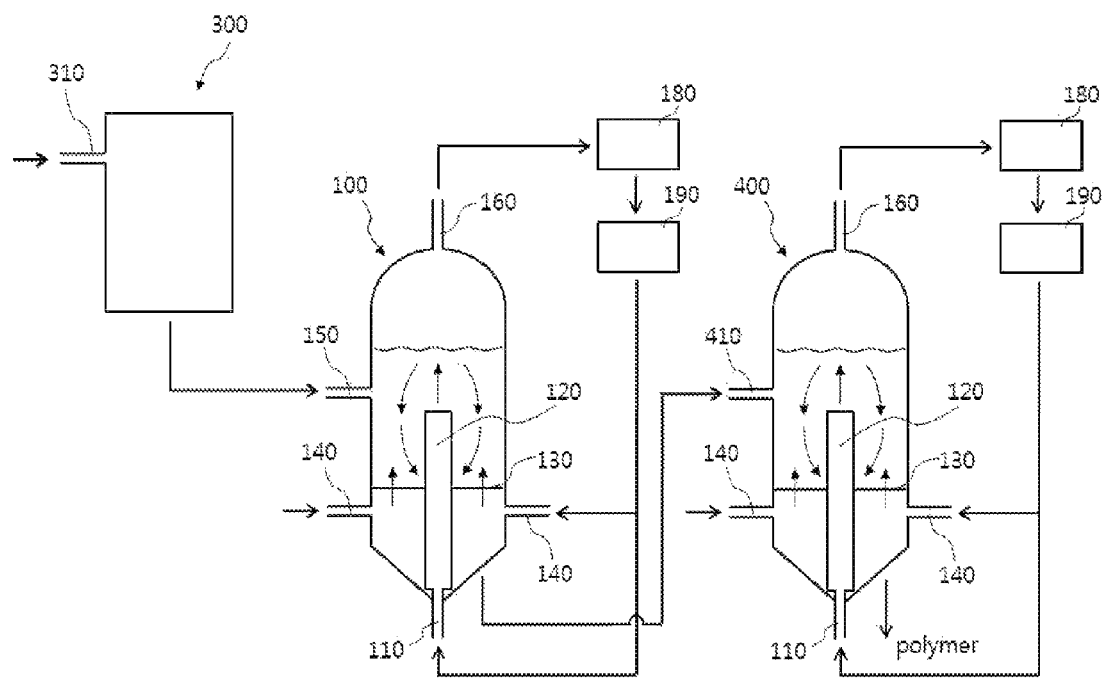

FIG. 3 shows an internal circulating fluidized bed polymerization reactors where the polymerization method according to the second embodiment of the present invention can be carried out. In FIGS. 2 and 3, same reference numerals are provided to the functionally same or similar parts. The polymerization reactor 200 in FIG. 5 is different from the polymerization reactor 100 in FIG. 2 in the structure of gas distribution plate 230, and is equipped with partition tube 270, annulus (ring type) distribution plate 280, and the third circulation gas inlet 290. The following explanations are mainly provided for the different parts. The polymerization reactor 200 in FIG. 5 comprises a draft tube 220, a gas distribution plate 230, a partition tube 270, an annulus distribution plate 280, the first circulation gas inlet 110, the second circulation gas inlet 140, the third circulation gas inlet 290, a catalyst and pre-polymers inlet 150, a gas outlet 160, a polyolefin outlet (not shown) and so on.

The draft tube 220 divides the fluidized bed into two areas by being installed inside the polymerization reactor 200, preferably in the central part thereof. At least one penetration hole 220a is formed and the first circulation gas inlet 110 is connected on the lower part of the draft tube 220, and inner distribution plate 221 is installed on the inside and inner outlet 222 is installed on the upper part. The draft tube 220 in FIG. 5 has the same structure as the draft tube 120 in FIG. 2 except that the inner distribution plate 221 is installed on the bottom of the reactor connected with the first circulation gas inlet 110.

The partition tube 270 is located between the draft tube 220 and the side wall of the reactor and divides the annulus outside the draft tube 220 into an inner annulus and an outer annulus. The inner annulus which is an area between the draft tube 220 and the partition tube 270 means the area where polyolefin polymers move down by gravity, and the outer annulus which is an area between the partition tube 270 and the side wall of the reactor 200 means the area where the second circulation gas is supplied and polyolefin polymers formed by the second circulation gas move up. The reaction area of the reactor 200 is further divided by the partition tube 270 so that circulation of polyolefin particles in the reactor 100 is activated. The location of the partition tube 270 can be controlled for the better circulation of polyolefin particles between the draft tube 220 and the side wall of the reactor, and can be located at the position preferably 0.5 to 5 times, more preferably 1 to 3 times of the diameter of the draft tube 220 away from the draft tube 220. Namely, the distance between the partition tube 270 and the draft tube 220 is preferably 0.5 to 5 times, more preferably 1 to 3 times of the diameter of the draft tube 220. If the shape of the draft tube 220 is a square pillar, the diameter of the draft tube 220 is width or length of its horizontal cross section. If the partition tube 270 is located at a position away from the draft tube 220 by less than 0.5 times of the diameter of the draft tube 220, polymers in the inner annulus are less than polymers flows into the draft tube 220 so that polymers may be inefficiently circulated. If the partition tube 270 is located at a position away from the draft tube 220 by more than 5 times of the diameter of the draft tube 220, polymers flows into the draft tube 220 are less than polymers flows into the inner annulus so that chunks causing congestion in the inner annulus may be formed. The partition tube 270 may be formed to be inclined toward inside with 90 to 135° with respect to the bottom of the reactor. If the partition tube 270 is inclined by less than 90° with respect to the bottom of the reactor 200, polymers in the draft tube 220 are hindered in their flow and excessively congested in the draft tube 220 so that chunks may be formed. If the partition tube 270 is inclined by more than 135° with respect to the bottom of the reactor 200, polymers flows into the inner annulus are hindered in their flow and decreased in the inner annulus so that polymers may not circulate actively. The height of the partition tube 270 can be adjusted according to the size of the reactor.

The gas distribution plate 230 can be formed to be inclined toward the side wall of the reactor 200 from the partition tube 270. The gas distribution plate 230 plays the same role as the gas distribution plate 130 in FIG. 2 except that it is formed between the partition tube 270 and the side wall of the reactor 200. As shown in FIG. 5, preferably the gas distribution plate 230 can be formed on the top of the partition tube 270. The annulus distribution plate 280 can be formed to be inclined from the outside wall of the draft tube 220 to the partition tube 270. Preferably, the annulus distribution g plate 280 can be formed to be inclined toward the outside wall of the draft tube 220, for example, by the angle of 15 to 70° with respect to the bottom of the reactor. If the annulus distribution plate 280 is formed to be inclined by an angle, not parallel, to the bottom of the reactor, polyolefin particles can be easily gathered around the penetration hole 220a of the draft tube 220 and can flow easily into the penetration hole 220a. It is preferable that the penetration hole 220a is formed on a higher position than the annulus distribution plate 280 to enable the polyolefin particles to flow easily into the penetration hole 220a and to circulate. If the angle of inclination of the annulus distribution plate 280 is less than 15°, heat of polymerization may be removed insufficiently by the increased congested area so that chunks may be formed, and if the angle of inclination is more than 70°, flow of polymers into the draft tube 220 may decrease so that chunks causing the congestion in the annulus may be formed.

Through the third circulation gas inlet 290, the third circulation gas is supplied to the inner annulus formed by the partition tube 270. The third circulation gas supplied to the annulus inside the reactor from the third circulation gas inlet 290 through the annulus distribution plate 280 is introduced in the form of dispersed bubbles so that circulation of polyolefin particles is promoted. The third circulation gas passing the annulus distribution plate 280 can be operated with a flow velocity of 0.5 to 30 times, preferably 0.5 to 10 times, more preferably 0.6 to 5 times, most preferably 0.8 to 3 times of the minimum fluidization velocity. If the flow velocity is less than 0.5 times of the minimum fluidization velocity, polymer particles may not flow and their inflow through the penetration hole 220a may decrease, and if the flow velocity is more than 30 times, the amount of polymer particles flowing in the inner annulus may decrease. In other words, the third circulation gas flows with lower velocity than the first circulation gas flowing into the draft tube 220 so that polyolefin particles in the inner annulus flows into the draft tube 220 in which the flow velocity is fast through the penetration hole 220a and circulation of polyolefin particles is generated.

Figure 4:
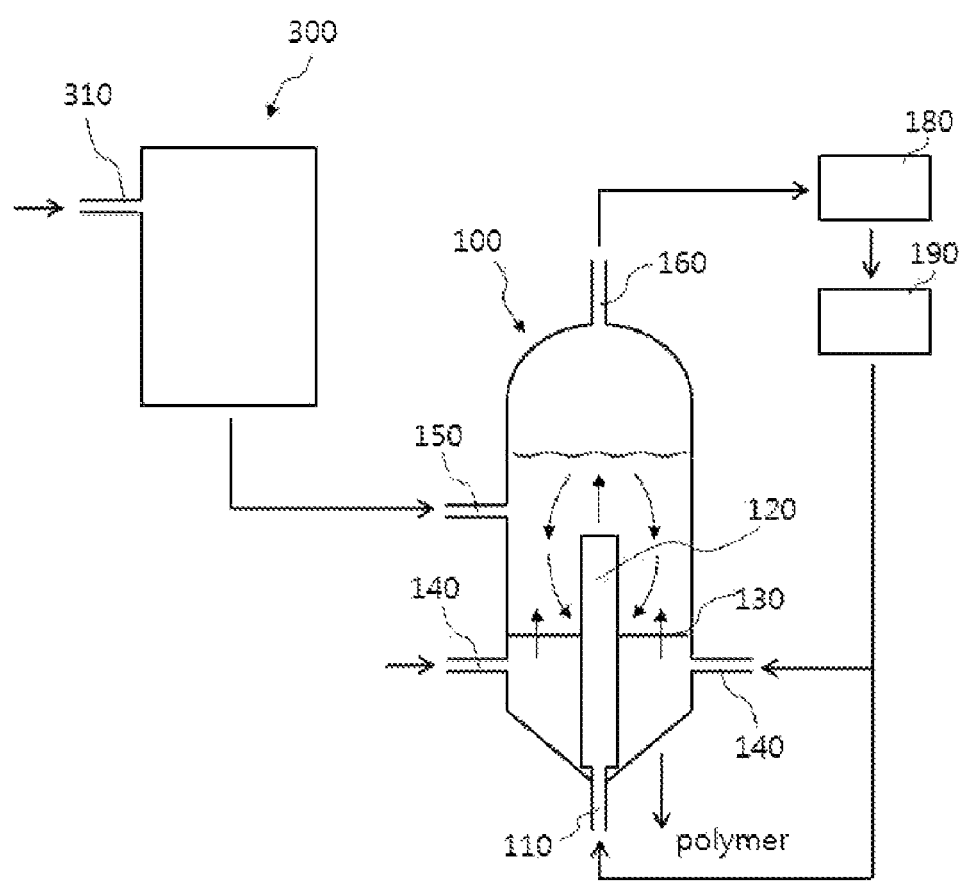
FIGS. 4 and 5 respectively show a pre-polymerization reactor and an internal circulating fluidized bed polymerization reactor where the polymerization method of alpha-olefin according to the third and fourth embodiment of the present invention can be carried out.

FIG. 4 shows a pre-polymerization reactor and an internal circulating fluidized bed polymerization reactor where the polymerization method according to the third embodiment of the present invention can be carried out. The method for gas-phase polymerization according to the third embodiment of the present invention comprises the steps of: producing polyolefin pre-polymers by pre-polymerizing catalyst, liquid isobutane, and one or more alpha-olefins in a pre-polymerization reactor; supplying a mixture of the catalyst and the pre-polymers, and a circulation gas including one or more alpha-olefins and inert gas to a polymerization reactor; polymerizing the pre-polymers and the alpha-olefin to polyolefin in the polymerization area of the polymerization reactor; and discharging produced polyolefin polymers from the reactor.

As shown in FIG. 4, the internal circulating fluidized bed polymerization reactor 100 and a pre-polymerization reactor 300 can be used for the gas-phase polymerization method according to the third embodiment of the present invention. A conventional continuous stirred tank reactor (CSTR), a loop reactor, and so on can be used as the pre-polymerization reactor 300. The polymerization reactor 100, 200 used in the first and second embodiment of the present invention can be used as the polymerization reactor 100. In FIG. 4, the catalyst and pre-polymers inlet 150 is to supply a mixture of the catalyst and polyolefin pre-polymers discharged from the pre-polymerization reactor 300 into the polymerization reactor 100. The circulation gas discharged from the gas outlet 160 is pressurized in a compressor 180, and the heat of polymerization is removed for the circulation gas in a heat exchanger 190. The cooled circulation gas may flow into the reactor 100 again through the first and second circulation gas inlet 110, 140.

In case of using the pre-polymerization reactor 300 according to the third embodiment of the present invention, the catalyst, which is supplied to the pre-polymerization reactor 300 through a raw material supplying pipe 310, can be a conventional olefin polymerization catalyst. Examples of the catalyst include metallocene catalysts such as (n-BuCp)$_2$ZrCl$_2$, optionally, supported on silica. The alpha-olefin(s) supplied to the raw material supplying pipe 310 is a reactant for the pre-polymer and can be a compound represented by CH$_2$=CHR (wherein, R is a hydrogen atom or a hydrocarbon radical of 1 to 12 carbon atoms), for example, ethylene, 1-hexene, and so on. The liquid isobutane supplied to the raw material supplying pipe 310 is used as a reaction medium of pre-polymers and may enable produced pre-polymers, catalysts, and reactants to be exist in a slurry state. The liquid isobutane can also increase the partial pressure of alpha-olefin and thereby maintain the high concentration of alpha-olefin, and can increase the productivity (polymerization yield: grams of pre-polymers per a gram of catalyst) of pre-polymers. The amounts of catalysts, alpha-olefin, liquid isobutane, and so on supplied to the pre-polymerization reactor 300 can be varied with specific limitation, but can be, for example, 10 to 100 weight parts of the alpha-olefin and 0.01 to 1 weight parts of catalysts with respect to 100 weight parts of the liquid isobutane.

The mixture of catalyst and polyolefin pre-polymers flows into the catalyst and pre-polymers inlet 150 from the pre-polymerization reactor 300 is the mixture of catalyst and produced polyolefin pre-polymers prepared in the pre-polymerization reactor 300. The pre-polymers are polymerized at, for example, the temperature of 20 to 80° C. and the pressure of 10 to 50 bar. The pre-polymers are produced in the amount of 1 to 300 times, preferably 10 to 300 times, more preferably 50 to 250 times of the amount (weight) of catalyst (polymerization yield: 1 to 300 g pre-polymers/1 g catalyst). The polyolefin pre-polymers can maintain the maximum activity at high temperature and pressure and be prepared with high yield by being used in gas-phase polymerization process of alpha-olefin. If polymerization yield of the pre-polymers is less than 1 (1 g pre-polymers/1 g catalyst), in gas-phase polymerization condition, the surface area of the pre-polymers becomes smaller for polymerization activity, and produced polymers are easily crushed and form fine particles because of a sharp increase in inner temperature by the heat of reaction. The produced fine particles may interrupt the operation because they may adhere to the circulation gas pipe and so on by being entrained with the flow of the circulation gas or block pipes of the heat exchanger 290 and so on as lumps of particles. Moreover, it is not preferable that the yield of polymerization of the pre-polymers is more than 300 (300 g pre-polymers/1 g catalyst), because the amount of liquid isobutane to be supplied should increase sharply and the volume of the pre-polymerization reactor 300 should become larger, and energy consumption during the process of producing pre-polymers is more than thermal stability obtainable by pre-polymers during gas-phase polymerization, and a recirculation device is needed. The amount of the pre-polymers can be varied without limitation, but can be supplied by, for example, 0.01 to 10 weight parts to 100 weight parts of polyolefin polymers produced in the polymerization reactor 100. The pre-polymers can be supplied as a mixture with the catalyst into the polymerization reactor 100.

The circulation gas flowing into the draft tube 120 through the first circulation gas inlet 110 or flowing into the polymerization reactor 100 through the second circulation gas inlet 140 is a reaction gas used for the polymerization of polyolefin and comprises alpha-olefin(s) and one or more inert gases (dispersion medium), and induces the inner circulation of polymerized polyolefin particles by flowing into the draft tube 120 and the reactor 100 with a flow velocity for forming sufficiently small bubble bed or slugging bed. The alpha-olefin may be same as the alpha-olefin supplied to the polymerization reactor 100, and the inert gas can be selected from the group consisting of nitrogen and aliphatic hydrocarbon compounds of 2 to 6 carbon atoms, and the total partial pressure of the inert gas can be 5% to 90%, preferably 10% to 90%, more preferably 30% to 85% with respect to the total pressure of the circulation gas. The inert gas may be a single gas or a mixture of two or more gases, preferably nitrogen, ethane, isobutane, mixtures thereof, and so on. The inert gas maintains total reaction pressure enough to maintain the pressure of the circulating compressor, and at the same time, controls reaction dynamics and induces heat exchange of particles in the reaction bed, and provides mass flow velocity suitable to remove the heat of reaction unremoved by a cooler.

FIG. 5 shows a pre-polymerization reactor 300 and internal circulating fluidized bed polymerization reactors 100, 400 where the polymerization method according to the fourth embodiment of the present invention can be carried out. The method for gas-phase polymerization according to the fourth embodiment of the present invention further comprises the steps of: supplying polyolefin polymers discharged from the polymerization reactor and a circulation gas including one or more alpha-olefins and inert gas to the second polymerization reactor; further polymerizing the discharged polyolefin polymers and the alpha-olefin to polyolefin; and discharging produced polyolefin polymers from the second polymerization reactor. The fourth embodiment is provided to further increase the productivity of polyolefin or to prepare bimodal polymers or bi-density polymers by further polymerizing polyolefin polymers which is different from the polyolefin polymers formed in the (first) polymerization reactor 100 in molecular weight and density.

As shown in FIG. 5, for the fourth embodiment of the present invention, the pre-polymerization reactor 300 and two internal circulating fluidized bed polymerization reactors (the polymerization reactor 100 and the second polymerization reactor 400) are used. The second polymerization reactor 400 has the substantially same structure and function as the polymerization reactor 100, and is connected to the polymerization reactor 100 in parallel or in series. Same reference numerals are provided to the functionally same parts in the second polymerization reactor 400 and the polymerization reactor 100. The second polymerization reactor 400 comprises a draft tube 120, a gas distribution plate 130, the first circulation gas inlet 110, the second circulation gas inlet 140, a gas outlet 160, a polyolefin outlet (not shown) and so on like the polymerization reactor 100, and have a polyolefin polymers inlet 410 instead of the catalyst and pre-polymers inlet 150.

The polyolefin polymers inlet 410 is to supply polyolefin polymers discharged from the polymerization reactor 100 into the second polymerization reactor 400. Like the catalyst and pre-polymers inlet 150, it is preferable that the polyolefin polymers inlet 410 is located at the side wall of the second polymerization reactor 400 in which fluidized bed is formed so that polyolefin polymers can be dispersed and supplied smoothly through the fluidized bed of polyolefin particles. The amount of polyolefin polymers supplied to the second polymerization reactor 400 depends on the desired properties of final polyolefin polymers, but may be, for example, 20 to 120 weight parts per 100 parts of polyolefin polymers produced in the second polymerization reactor 400.

Polyolefin polymers in the method of the present invention are discharged from a proper position in an area of high solid density, for example, the annulus where there is plenty of densified fluidized polymers, so that the amount of entrained gas can be minimized. And, the collection of the produced polymers can be controlled continuously by installing a control valve at a proper position of the upper area for discharging polymers discharged from the polymerization area (the annulus). Therefore, in the method of the present invention, the amount of gas accompanied by polymers is very little and only slightly more than the amount of gas achievable by the conventional equipment (equipment in which a series of hoppers operated alternately and intermittently is arranged). By this method, the limitation of the conventional discharging system related to the amount of entrained gas and properties of discharged products can be overcome. Moreover, polymerization also can be carried out by continuous multi-step method, by applying conventional polymerization step (bulk-phase or gas-phase, fluidized bed or stationary bed) to the upper region or the lower region of the polymerization area (the reactor) where the method of the present invention is applied. For example, a multi-step method which carries out two or more steps can be used with the method of the present invention.

The gas-phase polymerization method according to the present invention has following advantages. First, relatively simple loop-structural reactors can be used. Actually, each reaction area can be formed by a cylindrical reactor of high H/D ratio (height-to-diameter ratio), and this kind of reactors can be operated at high pressure. This is not economical in conventional fluidized bed reactors. Therefore, the method of the present invention can be carried out at an operating pressure of 0.5 to 10 MPa, preferably 1.5 to 6 MPa. The high gas density promotes heat exchange on a single particle and removal of heat of reaction, so that operating conditions improving reaction dynamics can be selected. Furthermore, a reactor in which polymers flow under fast fluidization conditions (riser) can be fully operated even at a polymer density over 200 kg/m$^3$. Therefore, much higher specific productivity (hourly production per unit volume of a reactor) can be obtained by the method of the present invention than conventional fluidized bed method, and plant installation costs can be curtailed by reducing the size of polymerization reactor.

Moreover, in the annulus, polymers circulate downward to hinder flow of circulation gas ascending through the gas distribution plate(130, 230), and crush bubbles of circulation gas into downsized ones for the surface area of circulation gas, that is, contact area with polymer particles to be increased so that reaction productivity is improved. And, solid-to-gas ratio at the inlet of the draft tube(120, 220) is higher than that of general fluidized bed reactors, and gas content in discharged polymer particles is low, so that the volume of post-processing equipment such as dryer, degassing equipment, and so on and costs for energy and installation can be reduced. Moreover, the amount of circulating solids can be controlled by controlling the flow of circulation gas supplied to annulus and riser, so that activity, productivity, and so on of the reactor can be controlled freely. And, polymer hold-up of the reactor can be maintained more highly than that of general fluidized bed reactors while entrainment rate of polymers is suppressed, and the effect of length-to-diameter (L/D) ratio of the reactor is low, so that free design of a reactor is possible. Moreover, flow velocity in the draft tube(120, 220) is fast when operating by supercondensed mode (U.S. Pat. No. 5,352,749) or condensed mode (U.S. Pat. No. 4,543,399), so that supercondensed mode operation is available by injecting a condensate without any specific device.

Moreover, in the method of the present invention, if the inner distribution plate 121, 221 is not installed in the riser, (1) entrained fine particles can circulate freely, (2) blocking of holes of the inner distribution plate 121, 221 by agglomerating of particles entrained with circulation gas to the upper part of the reactor below the inner distribution plate 121, 221 can be prevented, and (3) energy loss (generation of pressure difference) caused by the inner distribution plate 121, 221 can be prevented. And, (4) if weeping (a phenomenon that polymer particles fall down to plenum through holes of the inner distribution plate 121, 221 by their violent motion) of big particles in the reactor is occurred, chunks of polymers caused by impossibility of reascension to the upper part from the lower part the inner distribution plate 121, 221 can be prevented, so that big particles also can recirculate easily and long-term stable operation is possible.

In the method of the present invention, even if, in the gas recycling line of solid/gas separating area (gas outlet 160), there are entrained solids and discharged liquid from a cooler in the same line, this does not limit the efficiency of the riser. For example, even if gas distributing device such as a grid is used, gas flow velocity in the charging area of the lower part of the grid high enough, and entrainment of sizeable droplets of moisturized polymers is possible without any stagnant zone. When moving gas contacts with hot polymers arrived from the annulus, liquid in gas is evaporated immediately. Therefore, circulation gas (that is, gas mixture) leaving solid/gas separating area (that is, getting out the reactor 100, 400 through the gas outlet 160) can be partially condensed by cooling to the temperature of lower than dew point and can recirculate to the reactor 100, 400. Moreover, in the method of the present invention, alpha-olefin of circulation gas supplied to the riser may comprise makeup monomers condensed at least partially. As the makeup monomers which are low-vapor-pressure materials (alpha-olefin) easily being able to be liquified, propylene, 1-butene, 1-pentene, 1-octene, and so on can be used. And as equipment supplying the makeup monomers to the reactor, atomizers, sprays, or specially designed pipes can be used. If condensed makeup monomers are contained in circulation gas, heat of polymerization (heat of reaction) generated during polymerization reaction of alpha-olefin can be removed more easily by latent heat of evaporation of condensed makeup monomers flowing into fluidized bed. In the case that the condensed makeup monomers are contained, for example, they can be supplied as 5 to 20 weight parts to 100 weight parts of produced polyolefin polymers.

Successively formed gas/liquid mixture has not conventional problems and limitations, and is supplied to the riser contributing to removal of heat without using complex equipment. In the method of the present invention, new method to remove heat of reaction is used, instead of or added to partial condensation of recirculation gas. The characteristic shape (high surface-to-volume ratio) of polymerization area accompanied by fast fluidization enables direct heat exchange in the area and maximum heat transfer between cooling liquid and reaction system to be carried out by sizeable surface area of its outside. If necessary, there may be additional or other surface for heat exchange inside the reactor. Intensive turbulence related to fast fluidization conditions and high solid/gas ratio improve the efficiency of heat transfer. Condensates which can exist on the inside wall of the reactor are removed continuously by strong radial and axial mixing of polymers in fast fluidization conditions. Regarding removal of heat of reaction, the method of the present invention has not problems unique to conventional method, and voluminal velocity of circulation gas need not depend on requirements of heat transfer.

Hereinafter, the preferable examples are provided for better understanding of the present invention. However, the present invention is not limited by the following examples.

Examples 1 to 3

Gas-Phase Polymerization of Alpha-Olefin

Metallocene catalyst ((n-BuCp)$_2$ZrCl$_2$) supported on silica (Product name: ES70Y, company: INEOS silica), ethylene and 1-hexene as an alpha-olefin, and ethane and isobutane as a dispersive medium (inert gas) were supplied in the gas-phase polymerization reactor 100 shown in FIG. 2, to carry out gas-phase copolymerization of alpha-olefin. Wherein, the supply and stay time of the monomers were controlled to obtain desired polymerization yield (grams of polymer per grams of solid catalyst component), and the temperature of recycled gas was maintained lower than the dew point, and another reaction conditions were represented in following Table 1. During the reaction, gas mixture was partially condensed on the wall of the reactor to contribute to remove heat of reaction, and fouling problem of reactants was not occurred.

TABLE 1

|  | Example 1 | Example 2 | Example 3 |
| --- | --- | --- | --- |
| Dispersive medium | Ethane/Isobutane | Ethane/Isobutane | Ethane/Isobutane |
| Temperature (° C.) | 80 | 75 | 65 |
| Pressure (bar) | 25 | 21 | 15 |
| Ethylene (mol %) | 20 | 15 | 40 |
| Ethane (mol %) | 50 | 50 | 50 |
| Isobutane (mol %) | 29.99 | 34.85 | 7 |
| Hydrogen (mol ppm) | 400 | 60 | 500 |
| 1-hexene (mol %) | 0.01 | 0.15 | 3 |
| Flow velocity of riser (m/s) | 4 | 4.2 | 5.5 |
| Flow velocity of annulus (m/s) | 0.7 | 0.8 | 0.9 |
| Specific productivity (kg/h · m$^3$) | 95 | 113 | 85 |
| Product density (kg/l) | 0.945 | 0.914 | 0.893 |
| Bulk density (kg/l) | 0.45 | 0.42 | 0.45 |

Examples 4 to 6

Gas-Phase Polymerization of Alpha-Olefin

Gas-phase copolymerization of alpha-olefin was carried out by the same method as Examples 1 to 3 except for the usage of ethane as dispersion medium (inert gas) and the reaction conditions represented in following Table 2. During the reaction, gas mixture was partially condensed on the wall of the reactor to contribute to remove heat of reaction, and fouling problem of reactants was not occurred.

TABLE 2

|  | Example 4 | Example 5 | Example 6 |
| --- | --- | --- | --- |
| Dispersive medium | Ethane | Ethane | Ethane |
| Temperature (° C.) | 80 | 75 | 65 |
| Pressure (bar) | 25 | 21 | 15 |
| Ethylene (mol %) | 20 | 15 | 50 |
| Ethane (mol %) | 79.99 | 84.85 | 47 |
| Hydrogen (mol ppm) | 400 | 60 | 500 |
| 1-hexene (mol %) | 0.01 | 0.15 | 3 |
| Flow velocity of riser (m/s) | 4 | 4.2 | 5.5 |
| Flow velocity of annulus (m/s) | 0.7 | 0.8 | 0.9 |
| Specific productivity (kg/h · m$^3$) | 50 | 70 | 45 |
| Product density (kg/l) | 0.945 | 0.914 | 0.893 |
| Bulk density (kg/l) | 0.45 | 0.42 | 0.45 |

Examples 7 to 9

Gas-Phase Polymerization of Alpha-Olefin

Metallocene catalyst ((n-BuCp)$_2$ZrCl$_2$) supported on silica (Product name: ES70Y, company: INEOS silica), ethylene and 1-hexene as an alpha-olefin, and liquid isobutane as a dispersive medium were supplied in the loop reactor as the pre-polymerization reactor 300 shown in FIG. 4, to carry out pre-polymerization of alpha-olefin, and then mixture of polyolefin pre-polymers polymerized in the pre-polymerization reactor 300 and catalyst, ethylene and 1-hexene as an alpha-olefin, and ethane and isobutane as a dispersive medium (inert gas) were supplied in the polymerization reactor 100 shown in FIG. 4, to carry out gas-phase copolymerization of alpha-olefin. Wherein, the supply and stay time of the monomers and pre-polymers were controlled to obtain desired polymerization yield (grams of polymer per grams of solid catalyst component), and the temperature of recycled gas was maintained lower than the dew point, and another reaction conditions were represented in following Table 3. During the reaction, condensed circulation gas contributes to remove heat of reaction in the fluidized bed, and fouling problem of reactants was not occurred.

TABLE 3

| | | Example 7 | Example 8 | Example 9 |
|---|---|---|---|---|
| Pre-polymerization reactor | Dispersive medium | Isobutane (liquid) | Isobutane (liquid) | Isobutane (liquid) |
| | Temperature (° C.) | 55 | 30 | 20 |
| | Pressure (bar) | 25 | 21 | 15 |
| | Polymerization yield (pre-polymer (g)/catalyst (g)) | 250 | 100 | 80 |
| | Bulk density (kg/l) | 0.45 | 0.42 | 0.45 |
| Polymerization reactor | Dispersive medium | Ethane/Isobutane | Ethane/Isobutane | Ethane/Isobutane |
| | Temperature (° C.) | 80 | 75 | 65 |
| | Pressure (bar) | 24 | 20 | 14 |
| | Ethylene (mol %) | 20 | 15 | 40 |
| | Ethane (mol %) | 50 | 50 | 50 |
| | Isobutane (mol %) | 29.99 | 34.85 | 7 |
| | Hydrogen (mol ppm) | 400 | 60 | 500 |
| | 1-hexene (mol %) | 0.01 | 0.15 | 3 |
| | Flow velocity of riser (m/s) | 4 | 4.2 | 5.5 |
| | Flow velocity of annulus (m/s) | 0.7 | 0.8 | 0.9 |
| | Specific productivity (kg/h · m³) | 95 | 113 | 85 |
| | Product density (kg/l) | 0.945 | 0.914 | 0.893 |
| | Bulk density (kg/l) | 0.45 | 0.42 | 0.45 |

Examples 10 to 12

Gas-Phase Polymerization of Alpha-Olefin

Gas-phase copolymerization of alpha-olefin was carried out by the same method as Examples 7 to 9 except for the usage of continuous stirred tank reactor (CSTR) as the polymerization reactor 100 shown in FIG. 4 and the reaction conditions represented in following Table 4. During the reaction, condensed circulation gas contributes to remove heat of reaction in the fluidized bed, and fouling problem of reactants was not occurred.

TABLE 4

| | | Example 10 | Example 11 | Example 12 |
|---|---|---|---|---|
| Pre-polymerization reactor | Dispersive medium | Isobutane (liquid) | Isobutane (liquid) | Isobutane (liquid) |
| | Temperature (° C.) | 45 | 30 | 20 |
| | Pressure (bar) | 25 | 21 | 15 |
| | Polymerization yield (pre-polymer (g)/catalyst (g)) | 200 | 90 | 70 |
| | Bulk density (kg/l) | 0.40 | 0.38 | 0.43 |
| Polymerization reactor | Dispersive medium | Ethane/Isobutane | Ethane/Isobutane | Ethane/Isobutane |
| | Temperature (° C.) | 80 | 75 | 65 |
| | Pressure (bar) | 24 | 20 | 14 |
| | Ethylene (mol %) | 30 | 25 | 40 |
| | Ethane (mol %) | 50 | 50 | 50 |
| | Isobutane (mol %) | 19.85 | 24.8 | 7 |
| | Hydrogen (mol ppm) | 20 | 60 | 500 |

TABLE 4-continued

| | | Example 10 | Example 11 | Example 12 |
|---|---|---|---|---|
| | 1-hexene (mol %) | 0.15 | 0.2 | 3 |
| | Flow velocity of riser (m/s) | 4 | 4.2 | 5.5 |
| | Flow velocity of annulus (m/s) | 0.7 | 0.8 | 0.9 |
| | Specific productivity (kg/h · m³) | 105 | 102 | 78 |
| | Product density (kg/l) | 0.957 | 0.914 | 0.893 |
| | Bulk density (kg/l) | 0.42 | 0.42 | 0.45 |

Examples 13 to 15

Gas-Phase Polymerization of Alpha-Olefin

Metallocene catalyst ($(n-BuCp)_2ZrCl_2$) supported on silica (Product name: ES70Y, company: INEOS silica), ethylene and 1-hexene as an alpha-olefin, and liquid isobutane as a dispersive medium were supplied in continuous stirred tank reactor (CSTR) as the polymerization reactor 100 shown in FIG. 5, to carry out pre-polymerization (polymerization according to polymerization yield and reaction conditions in Table 5) of alpha-olefin, and then mixture of polyolefin pre-polymers polymerized in the pre-polymerization reactor 300 and catalyst, ethylene and 1-hexene as an alpha-olefin, and ethane and isobutane as a dispersive medium (inert gas) were supplied in the polymerization reactor 100 shown in FIG. 5, to carry out gas-phase copolymerization of alpha-olefin. Polyolefin polymers polymerized in the polymerization reactor 100, ethylene and 1-hexene as an alpha-olefin, and ethane and isobutane as a dispersive medium (inert gas) were supplied in the second polymerization reactor 400 shown in FIG. 5, to carry out gas-phase copolymerization (secondary) of alpha-olefin. Wherein, the supply and stay time of the monomers and pre-polymers were controlled to obtain desired polymerization yield (grams of polymer per grams of solid catalyst component), and the temperature of recycled gas was maintained lower than the dew point, and another reaction conditions were represented in following Table 5. During the reaction, condensed circulation gas contributes to remove heat of reaction in the fluidized bed, and fouling problem of reactants was not occurred.

TABLE 5

| | | Example 13 | Example 14 | Example 15 |
|---|---|---|---|---|
| Pre-polymerization reactor | Dispersive medium | Isobutane (liquid) | Isobutane (liquid) | Isobutane (liquid) |
| | Temperature (° C.) | 45 | 30 | 20 |
| | Pressure (bar) | 25 | 21 | 15 |
| | Polymerization yield (pre-polymer (g)/catalyst (g)) | 200 | 90 | 70 |
| | Bulk density (kg/l) | 0.40 | 0.38 | 0.43 |
| Polymerization reactor | Dispersive medium | Ethane/Isobutane | Ethane/Isobutane | Ethane/Isobutane |
| | Temperature (° C.) | 80 | 75 | 65 |
| | Pressure (bar) | 24 | 20 | 14 |
| | Ethylene (mol %) | 30 | 25 | 40 |
| | Ethane (mol %) | 50 | 50 | 50 |
| | Isobutane (mol %) | 19.85 | 24.8 | 7 |
| | Hydrogen (mol ppm) | 20 | 60 | 500 |
| | 1-hexene (mol %) | 0.15 | 0.2 | 3 |

TABLE 5-continued

|  |  | Example 13 | Example 14 | Example 15 |
|---|---|---|---|---|
|  | Flow velocity of riser (m/s) | 4 | 4.2 | 5.5 |
|  | Flow velocity of annulus (m/s) | 0.7 | 0.8 | 0.9 |
|  | Specific productivity (kg/h · m³) | 105 | 102 | 78 |
|  | Product density (kg/l) | 0.957 | 0.914 | 0.893 |
|  | Bulk density (kg/l) | 0.42 | 0.42 | 0.45 |
| The second polymerization reactor | Dispersive medium | Ethane/Isobutane | Ethane/Isobutane | Ethane/Isobutane |
|  | Temperature (° C.) | 80 | 80 | 70 |
|  | Pressure (bar) | 24 | 20 | 14 |
|  | Ethylene (mol %) | 30 | 25 | 40 |
|  | Ethane (mol %) | 50 | 50 | 50 |
|  | Isobutane (mol %) | 19.85 | 24.8 | 7 |
|  | Hydrogen (mol ppm) | 40 | 60 | 500 |
|  | 1-hexene (mol %) | 0.15 | 0.2 | 3 |
|  | Flow velocity of riser (m/s) | 4 | 4.2 | 5.5 |
|  | Flow velocity of annulus (m/s) | 0.7 | 0.8 | 0.9 |
|  | Specific productivity (kg/h · m³) | 105 | 102 | 78 |
|  | Product density (kg/l) | 0.952 | 0.915 | 0.895 |
|  | Bulk density (kg/l) | 0.40 | 0.40 | 0.43 |

Experimental Example 1

Size Measurement of Bubbles

Figure 1:
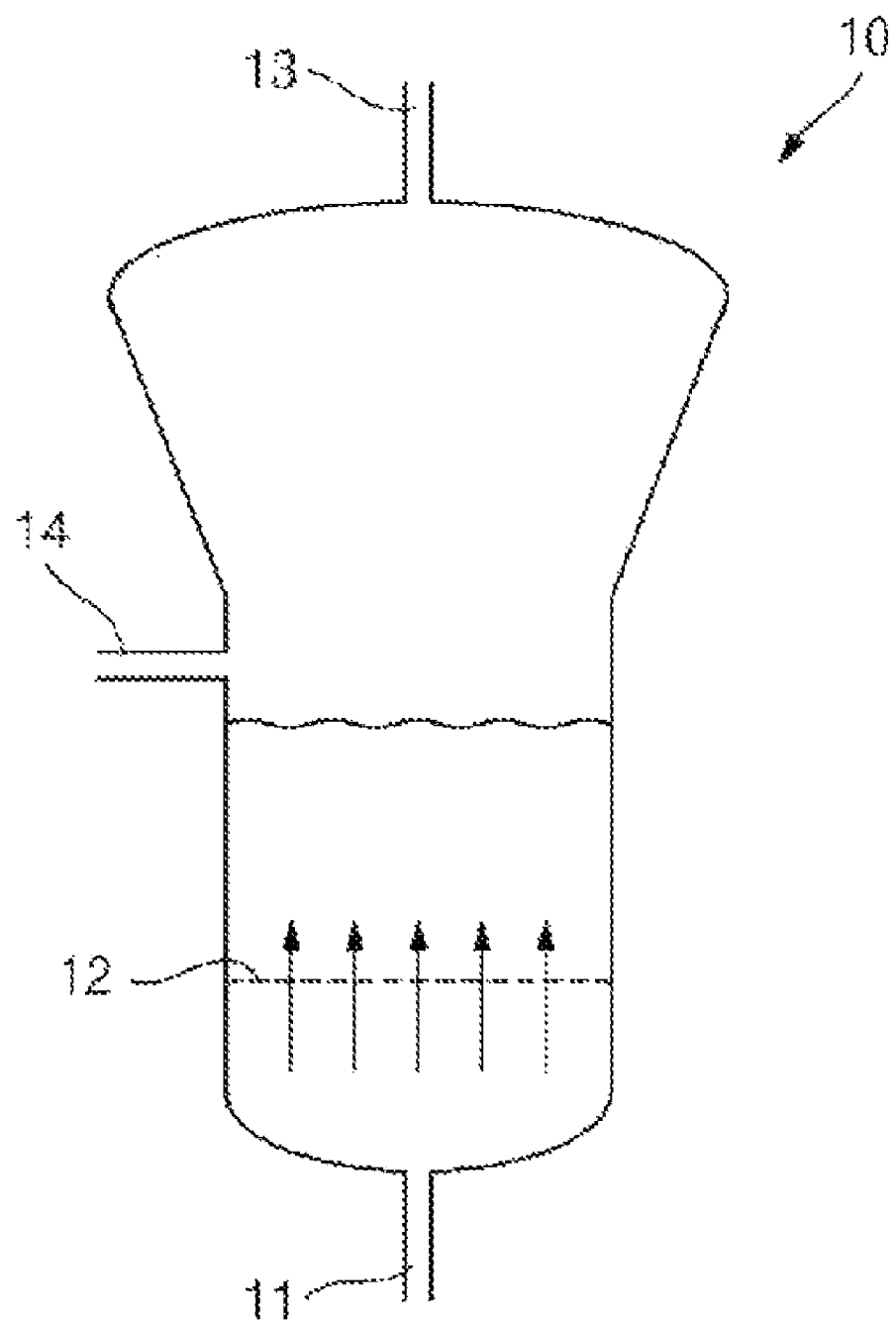
FIG. 1 shows a bubbling (internal circulating) fluidized bed polymerization reactor where a conventional polymerization method is carried out.

The sizes of bubbles of the circulation gas in bed materials of polyolefin particles having the sizes of 800 μm were measured with the conventional fluidized bed polymerization reactor shown in FIG. 1 and with the internal circulating fluidized bed reactor according to the present invention shown in FIGS. 2 and 3. As a result, the bubbles in the internal circulating fluidized bed reactor of the present invention were smaller than bubbles in the conventional gas fluidized bed polymerization reactor. Therefore, the contact area and time between the polyolefin particles and the reaction gas increases in the present invention.

Experimental Example 2

Measurement of Activity

The polymer productivities per unit hour were measured with the conventional fluidized bed polymerization reactor shown in FIG. 1 and with the internal circulating fluidized bed reactor according to the present invention shown in FIGS. 2 and 3. As a result, the internal circulating fluidized bed reactor of the present invention was better than conventional gas fluidized bed polymerization reactor in the polymer productivity.

As stated above, the internal circulating fluidized bed reactor of the present invention induces internal circulation of polyolefin particles so that their contact time with circulation gas is maximized and productivity of polyolefin increases.

What is claimed is:

1. An internal circulating fluidized bed polymerization reactor, comprising:
   a draft tube installed in the polymerization reactor, in which at least one penetration hole penetrating an inside and an outside of the draft tube is formed;
   a partition tube which is located between the draft tube and a side wall of the polymerization reactor and divides an inside area of the reactor into an annulus and an outside area;
   a gas distribution plate which is formed with an inclination from an outside of the partition tube to the side wall of the polymerization reactor; and
   an annulus distribution plate which is formed with an inclination from an outside of the draft tube to the partition tube.

2. The internal circulating fluidized bed reactor of claim 1, wherein the penetration hole is formed at a higher position than the contact position of the annulus distribution plate and the outside wall of the draft tube.

* * * * *